Figure 1:
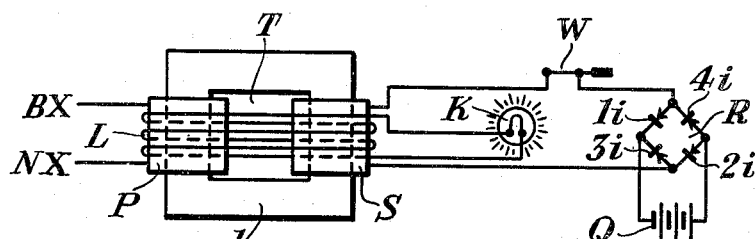

Oct. 7, 1952 S. A. STEVENS 2,613,260
INDICATOR FOR ALTERNATING ELECTRIC CURRENT TRANSFORMERS
Filed Nov. 7, 1947

INVENTOR.
Sydney Arthur Stevens
BY
HIS ATTORNEY

Patented Oct. 7, 1952

2,613,260

UNITED STATES PATENT OFFICE 2,613,260

INDICATOR FOR ALTERNATING ELECTRIC CURRENT TRANSFORMERS

Sydney Arthur Stevens, London, England, assignor, by mesne assignments, to Westinghouse Air Brake Company, a corporation of Pennsylvania Application November 7, 1947, Serial No. 784,671
In Great Britain April 24, 1947

4 Claims. (Cl. 177—311)

1

This invention relates to alternating electric current transformers, and has for its object to provide arrangements for automatically giving an indication that a transformer is under load, that is, is supplying current to a circuit connected to the secondary winding of the transformer.

According to the invention, the magnetic core of the transformer carrying the usual primary and secondary windings is provided with an additional winding so symmetrically disposed relative to the magnetic fluxes linked with the primary and secondary windings that an electromotive force is induced in the additional winding only in the event of there being any difference between these magnetic fluxes, the additional winding being connected to an electrical indication device such for example as an electric lamp.

When a transformer is energized by the connection of its primary winding to a supply circuit, the secondary winding being open-circuited, the only magnetomotive force in the transformer core is that due to the primary winding, so that substantially the same flux is linked with both the primary and secondary windings. When, however, the circuit of the secondary winding is closed, as is the case when the transformer is loaded, the current in the secondary winding causes a magnetomotive force in the core which is opposed to that due to the primary winding, with the result that the flux linked with the secondary winding is no longer substantially the same as that linked with the primary winding.

As a result, the additional winding consisting of a single coil oppositely linked with both these fluxes, or two coils each linked with one of the fluxes and oppositely connected together will, when the transformer is loaded, have induced therein an electromotive force causing a current to flow in the additional winding to energize the lamp or other indication device.

In carrying the invention into practice, the additional winding may consist of a flat coil surrounding both the primary and secondary winding core limbs, or suitably arranged on the yoke members connecting these limbs. Alternatively, an additional coil may be provided on each of the primary and secondary winding core limbs, these coils being reversely connected in series in the circuit of an incandescent lamp constituting the indication device.

In a still further form of the invention in which the primary and secondary windings of the transformer are arranged on different limbs of the core, the latter being provided with an additional limb constituting a leakage path for the magnetic flux, the additional winding is constituted by a coil surrounding the additional core limb.

The additional winding may only comprise a relatively small number of turns, so that a relatively low voltage lamp may be employed.

The invention is not limited to the particular arrangements above described by way of example, as the additional winding may be arranged or disposed in any position relative to the transformer core which will enable the winding to be energized, as above described.

I shall describe three forms of apparatus embodying my invention, and shall then point out the novel features thereof in claims.

Figure 2:
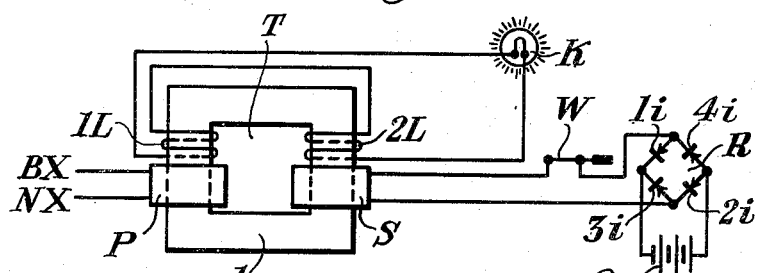
Figure 3:
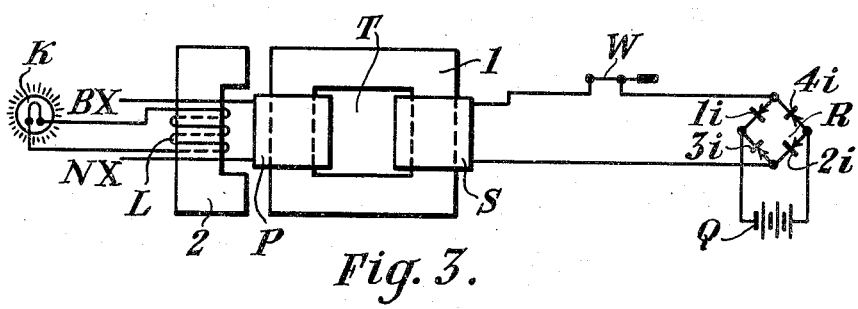

In the accompanying drawings, Fig. 1 is a diagrammatic view showing one form of apparatus embodying my invention, in which an additional or leakage flux winding consisting of a single coil surrounds both the primary and secondary windings of a transformer; Fig. 2 is a diagrammatic view showing a modified form of the apparatus of Fig. 1, in which an additional coil is provided on each of the primary and secondary winding core legs of a transformer; and Fig. 3 is a diagrammatic view showing another modified form of the apparatus of Fig. 1, in which an additional winding is provided on a leakage block for a transformer.

Referring first to Fig. 1, a transformer T is provided with a primary winding P on one of the legs of its core 1, and with a secondary winding S on the opposite leg of its core 1. An additional or leakage flux winding L surrounds both the primary and secondary windings P and S and core 1. An indication device, shown as a lamp K, is connected in a circuit which includes leakage flux winding L.

Primary winding P is constantly energized from a suitable source of alternating current having terminals BX and NX. Secondary winding S is connected through a circuit controller such, for example, as a switch W, with a load which may be a rectifier R charging a battery Q. Rectifier R may be of any suitable design such, for example, as the well-known bridge type comprising four asymmetric units 1i, 2i, 3i and 4i which may be of the well-known copper oxide rectifier type.

With primary winding P energized, and with the circuit shown for secondary winding S closed through switch W, a magnetomotive force in transformer core 1, which is caused by the current in the secondary winding S, opposes the magnetomotive force in the core which is caused by current in primary winding P. Therefore, a leakage magnetic flux is produced which links with winding L and generates electrical energy in winding L for lighting lamp K.

If the circuit for winding S is opened, such as by opening switch W or by a broken connection, or if, for any other reason, current ceases to pass from secondary winding S for charging battery Q, practically all the magnetic flux produced in core 1 by winding P will remain in core 1, so that there will be practically no leakage flux for energizing winding L. Lamp K will therefore be extinguished.

Referring next to Fig. 2, the form of apparatus here shown is similar to that in Fig. 1 except that, instead of winding L shown surrounding windings P and S and core 1, two other separate additional windings, constituting the additional or leakage flux winding, designated by the reference characters 1L and 2L, are shown. Winding 1L is around the same leg of core 1 as winding P, and winding 2L is around the same leg of core 1 as winding S. Windings 1L and 2L are connected in series with each other in a circuit which includes an indicator K. Windings 1L and 2L are also connected in this circuit in opposition to each other with respect to the magnetic flux in core 1 due to current in either winding P or S.

With winding P energized from terminals BX and NX, and with the circuit for winding S closed through switch W, the magnetomotive force produced in core 1 by the current in winding S opposes the magnetomotive force produced by the current in winding P, so that the flux linked with winding 2L will not be the same as that linked with winding 1L. The electromotive force resulting from the difference in electromotive forces thus generated in windings 1L and 2L passes current for lighting lamp K.

If the circuit for winding S is opened, or if for any other reason current ceases to pass from secondary windings S for charging battery Q, the only magnetomotive force in core 1 will be that due to winding P, and therefore the flux produced by this magnetomotive force, which links with winding 2L, will be practically the same as that which links with winding 1L. The electromotive force generated in winding 2L will therefore be practically equal and opposite to that generated in winding 1L, and hence lamp K will be extinguished.

Referring now to Fig. 3, the form of apparatus here shown is similar to that in Fig. 1 except that, instead of winding L shown surrounding windings P and S and core 1, a leakage block 2 is provided for core 1, and the additional or leakage winding L is placed around leakage block 2. With winding P energized from terminals BX and NX, and with the circuit for winding S closed through switch W, the magnetomotive force in core 1 due to the current in winding S opposes that due to the current in winding P, causing leakage flux to pass through leakage block 2. Winding L is therefore energized for lighting lamp K. If the circuit for winding S is opened, or if for any other reason current ceases to pass from secondary winding S for charging battery Q, practically all the magnetic flux produced in core 1 by winding P will remain in core 1, so that there will be practically no leakage flux through block 2 for energizing winding L. Lamp K will therefore be extinguished.

Although I have herein shown and described only a few forms of improvements relating to alternating electric current transformers embodying my invention, it is understood that various changes and modifications may be made therein within the scope of the appended claims without departing from the spirit and scope of my invention.

Having thus described my invention, what I claim is:

1. In combination, a transformer comprising a primary winding and a secondary winding on a core, a leakage block for said core, a leakage flux winding surrounding said leakage block, and an indication device energized by current from said leakage flux winding only if said primary winding is energized and said secondary winding is in a closed circuit.

2. In combination, a transformer comprising a primary winding and a secondary winding, a leakage block for said transformer, a leakage flux winding around said leakage block, and an indication device energized by current from said leakage flux winding only if said primary winding is energized and said secondary winding is in a closed circuit.

3. An alternating electric current transformer comprising a primary winding and a secondary winding and also an auxiliary winding, said secondary winding being positioned to link with primary magnetic flux produced by current in said primary winding, and said auxiliary winding being positioned to link with leakage flux from said transformer but being positioned out of linking relation with said primary magnetic flux which is in linking relation with both said primary winding and said secondary winding in said transformer.

4. In combination, a transformer comprising a primary winding and a secondary winding positioned to link with primary magnetic flux produced by current in said primary winding, an auxiliary winding positioned to link with leakage flux from said transformer but being positioned out of linking relation with said primary magnetic flux which is in linking relation with both said primary winding and said secondary winding in said transformer, indication means, and means for energizing said indication means by current from said auxiliary winding only if said primary winding is energized and said secondary winding is in a closed circuit.

SYDNEY ARTHUR STEVENS.

REFERENCES CITED

The following references are of record in the file of this patent:

UNITED STATES PATENTS

| Number | Name | Date |
| --- | --- | --- |
| 1,956,400 | Palueff | Apr. 24, 1934 |
| 1,986,112 | Logan | Jan. 1, 1935 |
| 1,992,013 | Palueff | Feb. 19, 1935 |
| 2,149,634 | Schweitzer | Mar. 7, 1939 |
| 2,226,021 | Schweitzer | Dec. 24, 1940 |
| 2,321,355 | Berman | June 8, 1943 |
| 2,475,017 | Duinker | July 5, 1945 |